US009248905B2

United States Patent
Gerard et al.

(10) Patent No.: US 9,248,905 B2
(45) Date of Patent: Feb. 2, 2016

(54) AIRCRAFT LANDING GEAR

(71) Applicants: AIRBUS OPERATIONS S.L., Getafe (Madrid) (ES); AIRBUS SAS, Blagnac (FR)

(72) Inventors: Ludovic Gerard, Getafe (ES); Alejandro Gutiérrez García, Getafe (ES); Julián Maldonado, Getafe (ES)

(73) Assignees: Airbus Operations S.L., Madrid (ES); Airbus SAS, Blagnac (FR)

( * ) Notice: Subject to any disclaimer, the term of this patent is extended or adjusted under 35 U.S.C. 154(b) by 309 days.

(21) Appl. No.: 13/894,944

(22) Filed: May 15, 2013

(65) Prior Publication Data

US 2013/0320144 A1     Dec. 5, 2013

(30) Foreign Application Priority Data

May 16, 2012   (EP) ..................... 12382179

(51) Int. Cl.
  *B64C 23/00*   (2006.01)
  *B64C 25/16*   (2006.01)
  *B64D 41/00*   (2006.01)
  B64C 25/00   (2006.01)

(52) U.S. Cl.
  CPC .............. *B64C 23/005* (2013.01); *B64C 25/16* (2013.01); *B64D 41/007* (2013.01); *B64C 2025/003* (2013.01); *B64D 2201/00* (2013.01)

(58) Field of Classification Search
  CPC .... B64D 41/007; B64D 2201/00; B64D 1/06; B64C 25/16; B64C 2025/003; B64C 1/0009
  See application file for complete search history.

(56) References Cited

U.S. PATENT DOCUMENTS

| 3,494,247 | A | * | 2/1970  | Teman et al. ................... 89/1.51 |
| 3,611,865 | A | * | 10/1971 | Schallert ......................... 89/1.51 |
| 4,214,721 | A | * | 7/1980  | Burhans et al. ........... 244/135 B |
| 4,520,975 | A | * | 6/1985  | Blackhurst ................. 244/137.4 |
| 5,803,405 | A | * | 9/1998  | Ellis et al. ...................... 244/130 |
| 5,845,879 | A | * | 12/1998 | Jensen ....................... 244/135 R |
| 5,975,466 | A | * | 11/1999 | Kahara et al. ............. 244/135 R |

(Continued)

FOREIGN PATENT DOCUMENTS

GB      2344325  A  *  6/2000  ............. B64C 25/20

OTHER PUBLICATIONS

Extended European Search Report issued Oct. 22, 2012 in EP 12382004.5-1254.

*Primary Examiner* — Philip J Bonzell
*Assistant Examiner* — Michael Kreiner
(74) *Attorney, Agent, or Firm* — Nixon & Vanderhye P.C.

(57) ABSTRACT

An aircraft (11) with at least an inflatable device (41) installed in a cavity (21) in its external surface which is equipped with a door (25) for opening/closing said cavity (21) is provided. The inflatable device (41), comprising a cushion (45) and a gas generator is configured for filling the cavity (21) with the cushion (45) when it is inflated with the gas supplied by said gas generator, without protruding from the cavity (21) for reducing the downstream air flow disturbances generated by said cavity (21) when the door (25) is open. The inflatable device (41) includes control means for inflating the cushion (45) in predetermined circumstances, being the door (25) open. The invention is particularly applicable to the cavities of the Main Landing Gear (31) for avoiding power losses to a Ram Air Turbine (51) placed behind it.

8 Claims, 2 Drawing Sheets

(56) References Cited

U.S. PATENT DOCUMENTS 5,988,567 A * 11/1999 Wille .................... 244/129.5
6,098,925 A * 8/2000 Burdsall et al. ............ 244/118.1
2002/0135137 A1 9/2002 Hammi
2009/0166473 A1 7/2009 Zuniga Sagredo

* cited by examiner

AIRCRAFT LANDING GEAR

This application and claims priority to EP 12382179.5 filed 16 May 2012, the entire contents of which is hereby incorporated by reference.

FIELD OF THE INVENTION

This invention relates to the effects of cavities in the surfaces of aircraft in equipment placed behind the cavities and, more in particular, to the effects of the cavities in the ventral fairing and the wing of an aircraft that house the Main Landing Gear (MLG) over a Ram Air Turbine (RAT) placed behind said cavities.

BACKGROUND OF THE INVENTION

The MLG of an aircraft is usually housed in cavities in the ventral fairing, and in the wing equipped with doors that are opened when the MLG is going to be deployed and that are closed after the MLG has been retracted into said cavities.

When the MLG is deployed in emergency conditions, these cavities cause disturbances on the downstream air flow that may cause problems to aircraft equipment located behind them such as a RAT.

A RAT is a small turbine connected to a hydraulic pump or electrical generator which is installed in an aircraft and used as an emergency power source. A RAT system generates power from the airstream taking advantage of the aircraft speed. Modern aircraft use the RAT only in emergency cases—i.e. loss of primary and auxiliary power sources—to supply their vital systems (i.e. flight controls, linked hydraulics and flight-critical instrumentation).

The prior art has not paid much attention to the effects of said disturbances due, probably, to the fact that they only occur during the deployment/retraction of the MLG. On the other hand, it is not expected a priori that the disturbances caused by cavities in the external surface of an aircraft may severely affect aircraft equipment placed behind them.

SUMMARY OF THE INVENTION

It is an object of the present invention to mitigate the disturbances on the downstream air flow created by cavities in the surface of an aircraft equipped with doors when their doors are open.

It is another object of the present invention to avoid a loss of power of a RAT located behind the MLG of an aircraft caused by the cavities in the ventral fairing and the wing that house the MLG.

These and other objects are met by installing in each cavity an inflatable device, comprising a cushion and a gas generator, configured for filling the cavity with the cushion when it is inflated with the gas supplied by said gas generator, without protruding from the cavity, for reducing the downstream air flow disturbances generated by said cavity when its door is open, being the inflatable device provided with control means for inflating the cushion in predetermined circumstances, being the door of the cavity open.

Said downstream air flow disturbances may particularly affect a RAT placed behind the cavity (according to the direction of the incoming airflow). In such a case, the cushion is inflated in case of an emergency condition to avoid a dynamic pressure reduction of the air feeding the Ram Air Turbine caused by said cavity.

The invention makes use of an inflatable device which is advantageously installed in a folded state in a central position of the wall of the cavity opposed to its door for filling the cavity when it is inflated.

In one embodiment, the cushion of the inflatable device is made with a front panel and a rear panel configured with substantially the same shape than the frontal and rear faces of the cavity and with a surface larger than them. This ensures that the cushion is compressed by the lateral walls of the cavity when the cushion is inflated facilitating the filling of the cavity.

The cushion may also include an internal strap joined to the front and rear panels for controlling its deployment.

A relevant applicability area of this invention is the MLG of an aircraft. Inflatable devices according to the invention are installed in the cavities in the ventral fairing and the wing of the aircraft that house the MLG. They are provided with a control system for being activated when the MLG is deployed and when the aircraft is in emergency condition (a condition requiring a RAT operating at its full power).

Other desirable features and advantages of this invention will become apparent from the subsequent detailed description of the invention and the appended claims, in relation with the enclosed drawings.

DETAILED DESCRIPTION OF THE INVENTION

Figure 1:
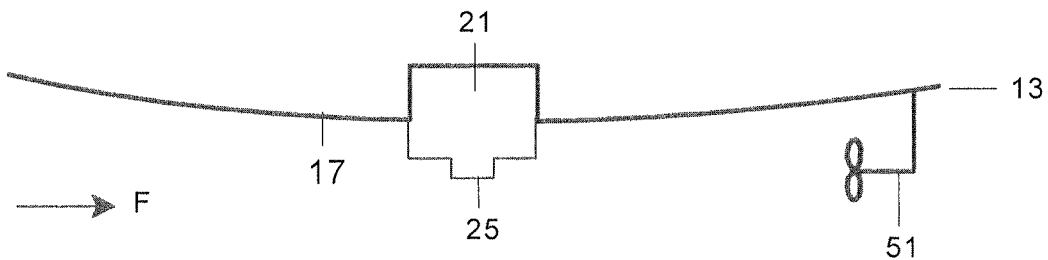
FIG. 1 is a schematic side view of the lower fuselage of an aircraft showing a RAT located behind a cavity equipped with a door.

FIG. 1 shows a RAT 51 placed in the lower fuselage 13 of an aircraft 11 behind a cavity 21 on its ventral fairing 17 according to the direction of the incoming airflow F.

According to the mentioned physics, when the door 25 of a cavity 21 located upstream the RAT 51 is open, the dynamic pressure of the air acting on the propeller disk of the RAT 51 is reduced with respect to the free-stream level and consequently the power generated is reduced.

If this effect takes place in an emergency situation in which the aircraft relies only on the power provided by the RAT, the consequences can be catastrophic.

Relocating the RAT is a costly solution both technically and economically since it implies both a redesign of the aircraft systems and a reinforcement of the structure to which it is attached, increasing aircraft weight and thus degrading performances. To solve the afore-mentioned problem avoiding such an undesirable solution, the invention proposes the installation of an inflatable device 41 in the cavity 21 to be inflated in a manner that fills it in case of an emergency situation.

Inflatable devices called airbags are well-known in the automotive industry. They basically consist of a folded cushion that is quickly inflated by means of a gas produced by a generator when certain sensor devices detect a collision of the vehicle. The cushion is thus deployed between the occupant of the vehicle and an area of it, protecting him or her during the collision.

During the normal operation of the cushion, the internal pressure produced by the generator when the cushion is filled with gas may be high enough to cause it to harden to the extreme that the occupant bounces off it. To prevent this drawback, they have been provided with a venting opening that reduces the internal pressure of the cushion and accordingly the possibility of causing injuries when they are activated.

Figure 2A:
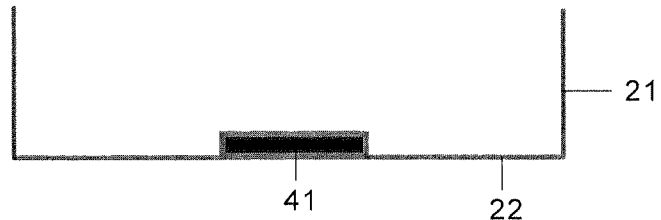
FIGS. 2a, 2b, 2c are schematic views of the deployment of an inflatable device installed in said cavity.
Figure 2B:
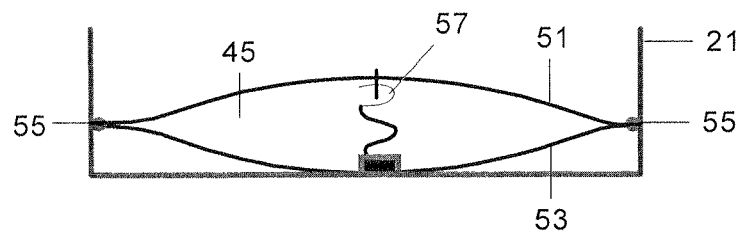
Figure 2C:
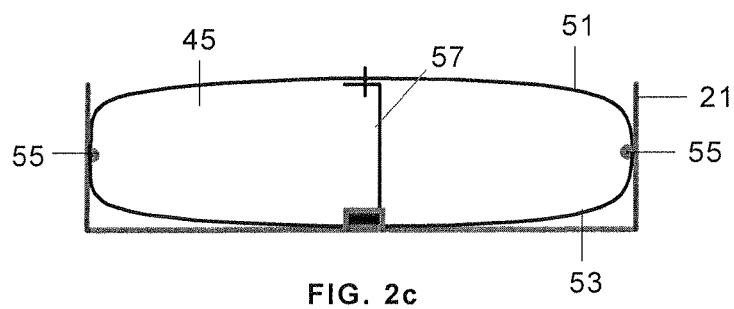
Figure 3A:
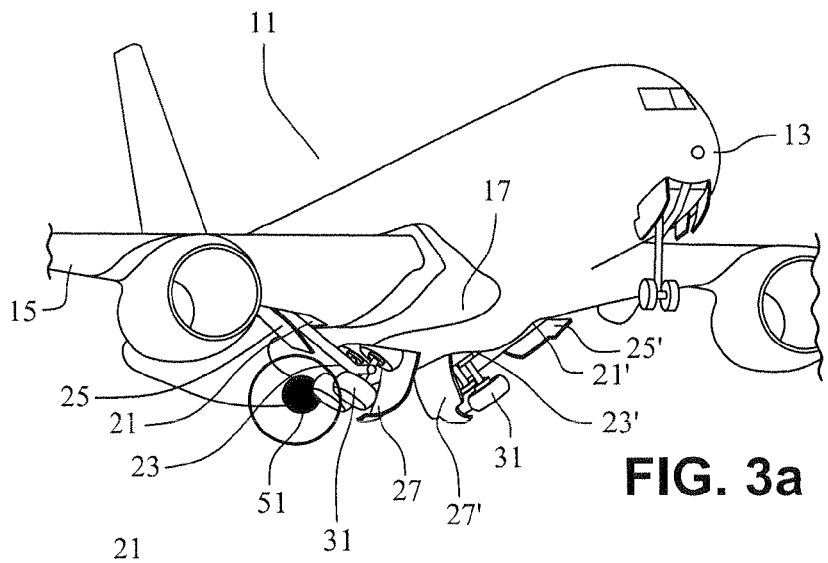
FIG. 3a is a perspective view of an aircraft showing the cavities left by the MLG in the wing and in the ventral fairing and their doors.
Figure 3B:
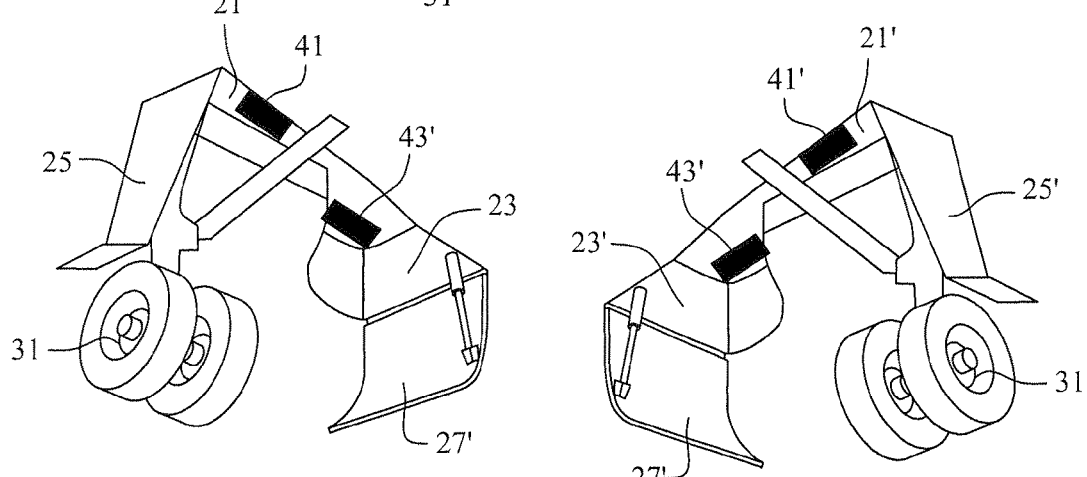
FIGS. 3b and 3c are detailed perspective views of said cavities when the MLG is deployed with the inflatable devices installed in them (in a folded state).
Figure 3C:
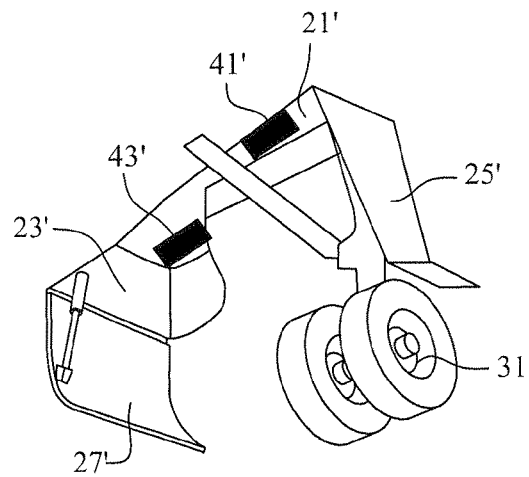
Figure 3D:
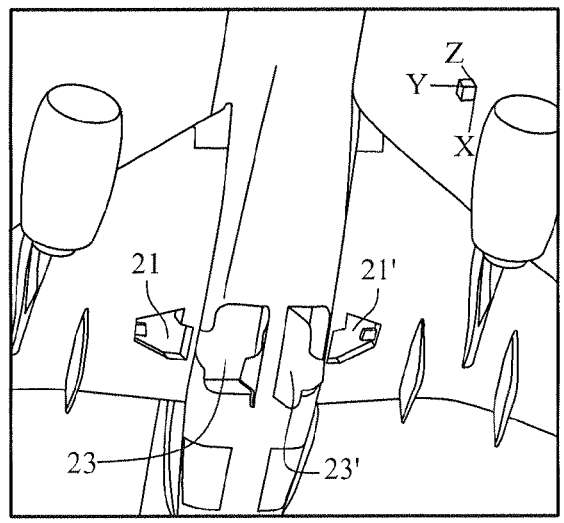
FIG. 3d is a detailed perspective view of the cavities without the MLG.

In FIGS. 2a, 2b and 2c, the inflatable device 41 is illustrated as it would be installed on the cavity 21. According to the invention, such device comprises a cushion 45 which is inflated by a gas generator (not shown) when the following circumstances, foreseen for its activation, take place:

The door 25 of the cavity 21 is open.

The aircraft is operating in an emergency condition that requires that the RAT 51 works at its full capacity.

The activation is governed by a control system that receives signals concerning the state of the door 25 and the flight conditions and accordingly emits a signal to the generator opening device (usually a pyrotechnic device) to initiate the gas supply to the cushion 45. Such process happens when the above mentioned circumstances occur.

FIG. 2a shows an embodiment of the inflatable device 41 in a folded state installed in the wall 22 of the cavity 12, i.e. the wall opposed to the surface in which the door 25 fits.

FIG. 2b shows an embodiment of the inflatable device 41 in an intermediate state of its deployment. The cushion 45 consists of a front 51 and a rear panel 53, joined at their peripheral edges by suitable joining means, and a strap 57 joined to the front and rear panels 51, 53 to control the deployment of the cushion. The use of a strap (or several straps) makes it possible to confer a "flattened" shape to the inflated cushion 45, which is the appropriate way to fill the cavity 21.

FIG. 2c shows an embodiment of the inflatable device 41 in its final state, filling almost 100% of the volume of the cavity 21 so that the re-circulation of the air flowing out of the cavity is avoided, eliminating, thus, the source of the reduction of the dynamic pressure of the air feeding the RAT 51.

The front and rear panels 51, 53 of the inflatable device 41 shall have a similar shape and a larger dimension than the frontal and rear faces of the cavity 21 so that the inflatable device 41 is kept compressed by the lateral walls of the cavity 21 when fully deployed.

The inflatable device 41 according to this invention shares certain features with the airbags of the automotive industry but it also has differential features such as, particularly, the following:

The inflatable device 41 is not intended to retain a body during its deployment but to fill a cavity 21 of a predetermined dimension. The inflatable device 41 is installed in a cavity 21 that plays an important role in the design of the inflatable device because its main functionality is to fill it. On the contrary, the airbags of the automotive industry are deployed towards an open space.

The inflatable device 41 shall remain inflated during the complete duration of the emergency condition which can be considerably longer than that required in the automotive industry airbags.

The material of the cushion 45 may differ from those used in the automotive industry.

According to this invention, in an embodiment of the inflatable device 41 the cushion 45 is made of a liquid crystal polymer fiber which is a suitable material to be used in its design as it is subjected to the requirements of an environment in which the aircraft is flying from cruise level to sea level in a wide range of speeds, air density, temperature, etc.

FIGS. 3a, 3b, 3c and 3d illustrate an embodiment of the invention for an aircraft in which the RAT 51 is located behind the MLG 31.

The RAT 51 is affected by the cavities 21, 21' located in the lower part of the wing 15 and by the cavities 23, 23' located in the ventral fairing 17 that house the MLG 31 when their doors 25, 25'; 27, 27' are open.

The inflatable devices 41, 41'; 43, 43' are installed in the cavities 21, 21'; 23, 23' in a central position of their inner walls so that they can be deployed in order to fill the cavities 21, 21'; 23, 23' in the manner explained above when an emergency landing shall be performed. In this case, the doors 25, 25'; 27, 27' are open and the RAT 51 is needed for providing the maximum possible power.

As illustrated in FIGS. 3a, 3b 3c and 3d the frontal and rear faces of the cavities 21, 21'; 23, 23' have an irregular shape. The front and rear panels of the inflatable devices 41, 41'; 43, 43' will have a similar shape and larger dimensions than the frontal and rear faces of the cavities 21, 21'; 23, 23'.

It is estimated that, in an emergency landing condition, the cavities 21, 21', 23, 23' in, respectively, the wing 15 and the ventral fairing 17 remain open reducing the dynamic pressure on the RAT up to 20% with respect to the free-stream level (for high sideslip angles). Using the inflatable devices 41, 41'; 43, 43' may improve those levels up to 50% for large sideslip angles.

Another additional advantage of the installation of inflatable devices 41, 41'; 43, 43' in the cavities 21, 21', 23, 23' is an improvement the of the inner flap effectiveness during emergency conditions/situations.

Although the present invention has been described in connection with various embodiments, it will be appreciated from the specification that various combinations of elements, variations or improvements therein may be made, and are within the scope of the invention.

The invention claimed is:

1. An aircraft comprising:
    at least one cavity including an external surface equipped with a door for opening/closing said cavity, the door being configured with a shape that maintains an aerodynamic continuity of the external surface of the aircraft when the door is closed,
    an inflatable device installed in a folded state in a central position of a wall of the cavity and opposite to the door, wherein the inflatable device includes a cushion and a gas generator configured to inflate the cushion, and wherein the cushion when inflated fills the cavity without protruding from the cavity and thereby reduces downstream air flow disturbances generated by said cavity while the door is open, and wherein the cushion comprises a front panel and a rear panel, wherein peripheral edges of the front and rear panels are joined and the front panel is configured to, when the cushion is inflated, cover a void surface of the cavity created by opening the door; and
    a controller of the inflatable device configured to inflate the cushion in response to a predetermined circumstance occurring while the door is open.

2. The aircraft according to 1, wherein back to the front panel and back to the rear panel of the cushion have substantially similar shapes to that of the frontal and rear faces of the cavity.

3. The aircraft according to claim 2, wherein the cushion also comprises at least an internal strap joined to the front and rear panels.

4. The aircraft according to claim 1, wherein:
said cavity houses an equipment to be deployed out of the cavity; and
the cushion inflated in response to the door being opened and the equipment deployed.

5. The aircraft according to claim 4, wherein:
the equipment is a Main Landing Gear of the aircraft;
a ventral fairing and a wing of the aircraft comprise, respectively, cavities with doors housing the Main Landing Gear and inflatable devices installed in said cavities.

6. The aircraft according to claim 1, wherein the cushion is made of a liquid crystal polymer fiber.

7. An aircraft comprising:
at least one cavity including an external surface equipped with a door for opening/closing said cavity, the door being configured with a shape that maintains an aerodynamic continuity of the external surface of the aircraft when the door is closed,
a Ram Air Turbine placed behind the cavity;
an inflatable device including a cushion and a gas generator configured to inflate the cushion, and wherein the cushion, when inflated fills, the cavity without protruding from the cavity to reduce downstream air flow disturbances generated by said cavity while the door is open; and
a controller of the inflatable device configured to inflate the cushion in predetermined circumstances, which include the door being opened, wherein the cushion is inflated by the controller in response to an emergency condition and to avoid a dynamic pressure reduction of air feeding the Ram Air Turbine.

8. An aircraft comprising:
a fuselage including a cavity configured to receive a landing gear and a door adjacent the cavity having a closed position closing the cavity and an open position which forms an opening on a surface of the fuselage aligned with the cavity;
an inflatable device installed in a folded state on a wall of the cavity and opposite to the door, wherein the inflatable device includes an inflatable cushion and a gas generator configured to inflate the cushion, wherein the cushion comprises a front panel and a rear panel, wherein peripheral edges of the front and rear panels are joined and when the cushion is inflated, the front panel covers the opening formed on the surface of the fuselage while the door is in the open state; and
a controller of the inflatable device configured to inflate the cushion in response to a predetermined circumstance occurring while the door is in the open state.

* * * * *